(12) United States Patent
Nakajima et al.

(10) Patent No.: US 7,260,305 B2
(45) Date of Patent: Aug. 21, 2007

(54) IMAGE RECORDING METHOD, APPARATUS AND STORAGE MEDIUM

(75) Inventors: Nobuyoshi Nakajima, Kaisei-machi (JP); Yukita Gotohda, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 1006 days.

(21) Appl. No.: 09/837,196

(22) Filed: Apr. 19, 2001

(65) Prior Publication Data

US 2003/0206668 A1 Nov. 6, 2003

(30) Foreign Application Priority Data

Apr. 19, 2000 (JP) ............................. 2000-117667
Mar. 19, 2001 (JP) ............................. 2001-078024

(51) Int. Cl.
H04N 7/00 (2006.01)
H04N 5/00 (2006.01)

(52) U.S. Cl. ........................................ 386/46; 386/125

(58) Field of Classification Search ................. 386/46, 386/107, 117, 125, 126, 45, 1, 4, 6, 38, 40, 386/124, 52, 55, 68, 69
See application file for complete search history.

(56) References Cited

U.S. PATENT DOCUMENTS 6,483,602 B1 * 11/2002 Haneda ..................... 358/1.16

| | | | |
|---|---|---|---|
| 2001/0026678 A1 * | 10/2001 | Nagasaka et al. | 386/70 |
| 2002/0056095 A1 * | 5/2002 | Uehara et al. | 725/38 |
| 2002/0071651 A1 * | 6/2002 | Wurz et al. | 386/46 |
| 2004/0021907 A1 * | 2/2004 | Truc et al. | 358/1.18 |
| 2004/0175148 A1 * | 9/2004 | Maruyama et al. | 386/95 |
| 2005/0125381 A1 * | 6/2005 | Yamada et al. | 707/2 |

FOREIGN PATENT DOCUMENTS

JP 406225265 * 8/1994

* cited by examiner

*Primary Examiner*—Robert Chevalier
(74) *Attorney, Agent, or Firm*—Birch, Stewart, Kolasch & Birch, LLP

(57) ABSTRACT

Confirmation of the content of the images recorded on a CD-R or other storage medium is made easier. A data obtaining means obtains plural sets of image data recorded on a digital camera, etc. data storage medium, and an image processing means subjects the obtained image data to image processing and obtains processed image data. The processed image data is recorded onto a CD-R, etc. storage medium by an image recording means. A representative image selecting means selects images representative of the images represented by the image data. Then, thumbnail images of the selected representative images are attached to the surface of the storage medium disk by a representative image attaching means.

9 Claims, 5 Drawing Sheets

IMAGE RECORDING METHOD, APPARATUS AND STORAGE MEDIUM

BACKGROUND OF THE INVENTION

1. Field of the Invention

The present invention relates to an image recording method and apparatus for recording plural sets of image data onto a CD-R, etc. recording medium, and to a storage medium for recording a program capable of causing a computer to execute the recording method according to the present invention.

2. Description of the Related Art

Services are currently offered wherein image data obtained by digitizing of a user's photographs, or image data obtained by photographing with a digital camera, etc. is recorded onto a CD-R, DVD-R, etc. storage medium. In these types of services, by use of a specialized viewer recorded on the storage medium or a viewer in the possession of the user, the images recorded on the storage medium can be viewed on a computer. In addition, in these services, when image data is recorded on a storage medium, a printed index is created at the same time and provided to the user in a package with the storage medium. Here, a common ID number is recorded on both the surface of the recording medium disk and the printed index, by first referring to the ID number, the type of image data recorded on the storage medium disk can be confirmed by referring to the corresponding printed index.

However, if the printed index is misplaced, because a user cannot know what kind of images are recorded on the storage medium without loading the storage medium disk into a computer and accessing the images stored on thereon via the viewer, a problem arises in that under such circumstances it is extremely time consuming to find the desired image. In this situation a user could request the service provider to reprint the index, however, the user incurs the substantial burden of the printing costs, etc.

SUMMARY OF THE INVENTION

The present invention has been developed in consideration of the circumstances described above, and it is a main objective of the present invention to provide an image recording method and apparatus in which it is easy to confirm the content of the images recorded on the storage medium, and a computer readable medium for recording a program that causes a computer to execute the image recording method according to the present invention.

According to the image recording method of the present invention, in which some or all of plural sets of image data are recorded on a storage medium, a representative image representing an from among the images represented by the plural sets of image data is selected, and a thumbnail image of the selected image is attached to the surface of the storage medium disk.

Here, the expression "representative image" can refer to any image or plurality of images that is representative of the images represented by the plural sets of image data recorded on the storage medium. For example, not only images represented by image data recorded in the storage medium, but images represented by image data other than that recorded on the storage medium can be used as a representative image for cases in which the image data recorded on the storage medium is some of plural sets of image data. In addition, not only images represented by image data recorded on a storage medium, but images represented by aforementioned image data after it has been subjected to any of various types of processing, such as enlargement, reduction, trimming, etc. can be used as representative images.

In addition, a single or multiple images can be the representative image(s). Further, the representative image can be an image specified in advance by a user from among the images represented by the recorded image data. Still further, according to the present invention, all of the images represented by some or all of the plural sets of the image data recorded on a storage medium may be used as representative images.

In addition, the expression "attached to the surface of the storage medium disk" refers to, for example, not only a thumbnail image of a representative image directly printed onto the surface of the storage medium disk, but also includes the sticking of a representative image printed out as a sticker, etc. onto the surface of the storage medium disk, or any other method providing for recognition of the representative images on the surface of the storage medium disk. Note that, although offset and screen-printing methods can be used as the method for printing thumbnail images onto the surface of the storage medium disk, a method such as that described in Japanese Unexamined Patent Publication No. 5(1993)-212857, wherein a toner image is formed by applying toner to a latent image formed on a photosensitive drum by a laser beam, etc., which is then transferred to a transfer drum by repetition of the transfer process employing a number of printing colors, whereby a full-color toner image is formed on the transfer drum and then transferred to the surface of the storage medium disk, can also be used. In addition, a method such as that described in Japanese Unexamined Patent Publication No. 10(1998)-100495, wherein a half cut process is applied to a heat-transfer sticker sheet after thumbnail images have been printed thereon by a heat-transfer method, can be used as a method of printing thumbnail image stickers.

Herein, "the surface of the storage medium disk" includes the physical region of recording on a storage medium and the support body thereof.

Note that according to the image recording method of the present invention, it is preferable that the representative image be selected based on the predetermined data attached to aforementioned plural sets of image data.

Here, the expression "predetermined data" can refer to, for example: information related to the date on which the image was obtained, because it is possible to attach data related to the date on which an image was obtained; data related to GPS, because it is possible to attach information related to GPS for images obtained by use of a camera equipped with a GPS function. In addition, depending on the camera, because it is possible to attach data related to the degree of importance of an image, data related to the degree of importance of an image may be used as the predetermined data. Further, the predetermined data can be the data attached by a user after photographing that indicates which image(s) represented by the image data should be the representative images. In this case, the file name of the image data representing the image(s) that should be the representative image(s) can be specified as "representative.jpg", etc.

Note that the expression "predetermined data can be attached" refers not only to attaching predetermined data to the file tag or header information, but can include, for example, attaching the predetermined data as another file corresponding to an image data.

In addition, it is preferable that the representative image be selected based on the degree of similarity of aforementioned plural sets of image data.

The image recording apparatus, for recording some or all of plural sets of image data on a storage medium, according to the present invention comprises a selecting means for selecting a representative image representative of the images represented by aforementioned plural sets of image data, and a representative image attaching means for attaching a thumbnail image of a selected representative image to the surface of the storage medium disk.

Note that according to the image recording apparatus of the present invention, it is preferable that aforementioned selecting means select the representative image based on the predetermined data.

In addition, according to the image recording apparatus of the present invention, it is preferable that aforementioned selecting means select the representative image based on the degree of similarity of the plural sets of image data.

According to the image storage medium for recording some or all of plural sets of image data of the present invention, an index image representative of the images represented by the plural sets of image data is attached to the surface of the storage medium disk.

Note that the image recording method according to the present invention may be provided as a program recorded on a computer readable medium that causes a computer to execute said image recording method.

According to the present invention, because a thumbnail image representative of the images represented by some or all of plural sets of imaged at a recorded on a storage medium is attached to the surface thereof, by looking at the surface of the surface of the storage medium, the content recorded thereon can be ascertained. Accordingly, even if there is no printed index, because it is becomes unnecessary to load the storage medium in a computer and view the images recorded thereon by use of a viewer in order to confirm the content (images) recorded on the storage medium, the amount of time and effort required when searching for a desired image can be reduced.

DESCRIPTION OF THE PREFERRED EMBODIMENTS

Hereinafter, a preferred embodiment of the present invention will be explained with reference to the drawings.

Figure 1:
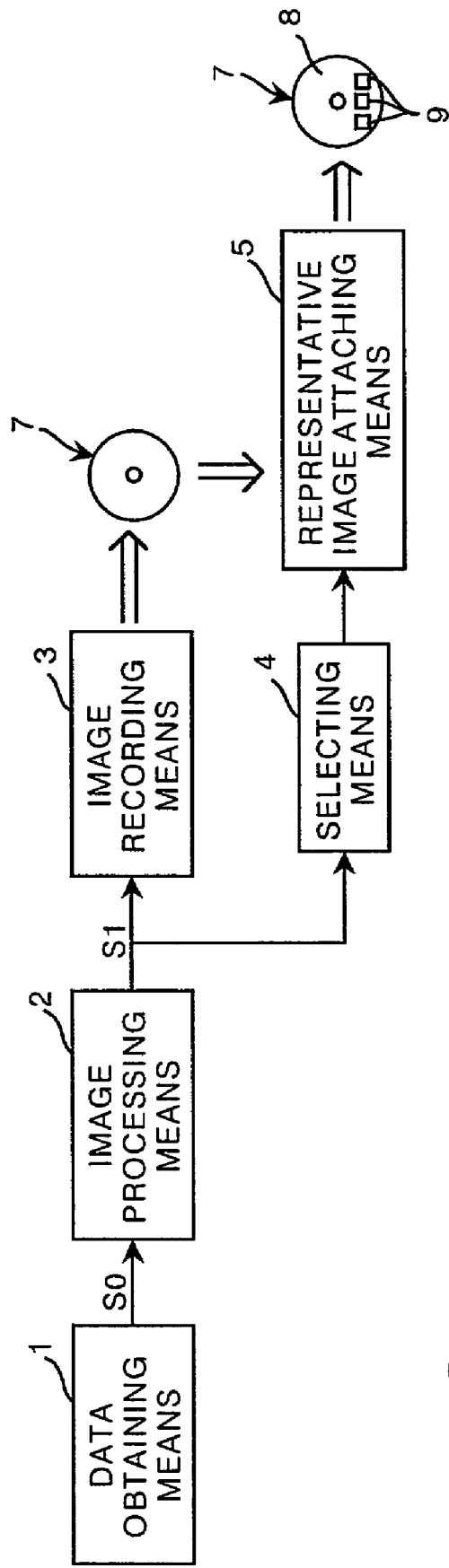
FIG. 1 is a schematic block drawing of the configuration of the image recording system according to a preferred embodiment of the present invention.

FIG. 1 is a schematic block drawing of an image recording system implementing the image recording apparatus according to a first preferred embodiment of the present invention. As shown in FIG. 1, the image recording system according to the first embodiment comprises a data obtaining means 1 for reading out image data S0 obtained by photoelectrically reading out images recorded on film or for reading out plural sets of image data S0 from a digital camera or digital video camera recording medium, an image processing means 2 for obtaining a processed image data S1 of each image data S0, an image recording means 3 for recording plural sets of image data S1 on a storage medium 7 such as a FD, Zip, Smart Media, Memory Stick, CD-R, DVD-R, etc., a representative image selecting means 4 for selecting an image representative of the images represented by the plural sets of image data S1, and a representative image attaching means 5 for attaching to surface 8 of storage medium 7 a thumbnail image of the representative image selected by representative image selecting means 4. Note that the current embodiment will be explained in terms of reading out image data S0 from a digital camera or digital video camera recording medium. In addition, according to the current embodiment, storage medium 7 is shown in the diagrams as a CD-R.

Image processing means 2 performs density correction processing, white-balance adjustment processing, gradation correction processing, sharpness processing, pixel number correction processing, blemish and dust mark removal processing, trimming processing, etc. predetermined image processing to image data S0 to obtain processed image data S1.

Figure 2:
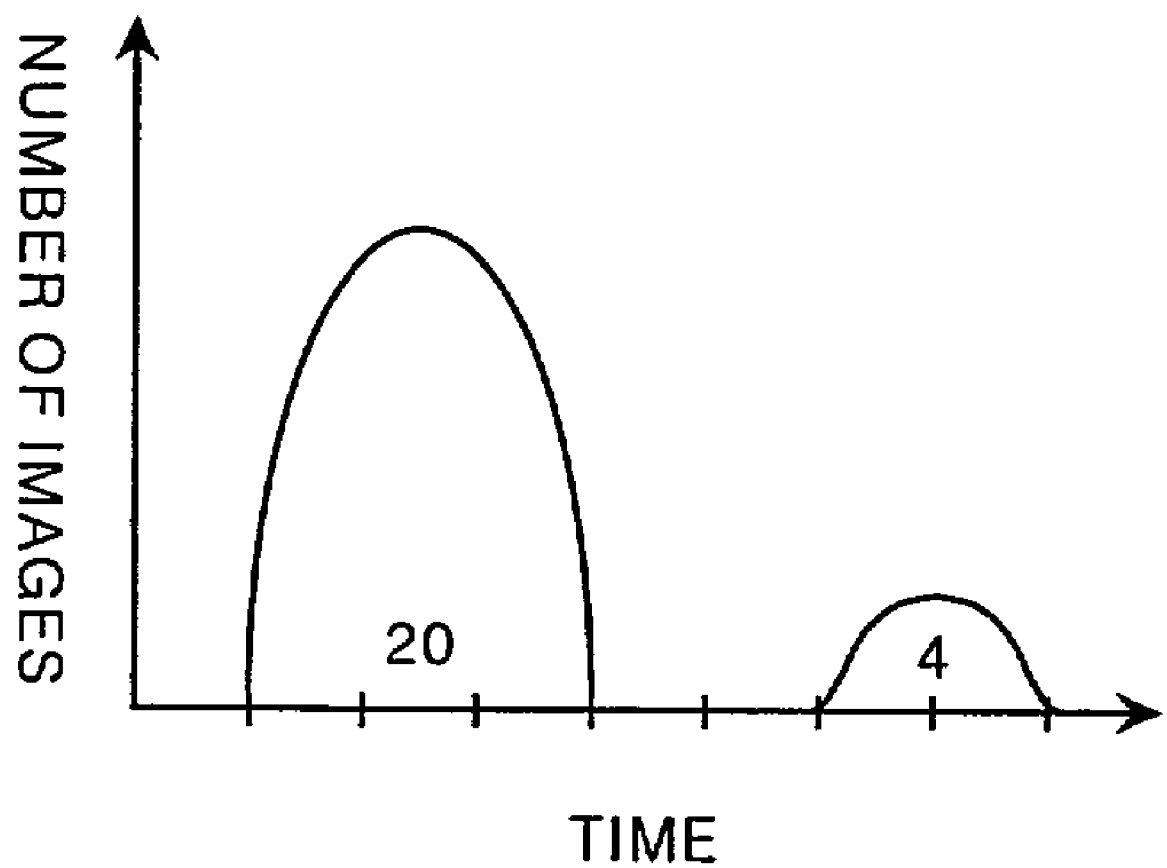
FIG. 2 is a drawing provided for explanation of the selection of a representative image.

Representative image selecting means 4 selects a representative image of the images represented by plural sets of image data S1. Note that in the current embodiment, three representative images will be selected. Here, in the current embodiment, image data S0 is obtained from a digital camera, etc. data storage medium, and information related to the date on which image data S0 was obtained is attached thereto. Accordingly, the information related to the date on which image data S0 was obtained is also attached to image data S1, and a representative image is selected in representative image selecting means 4 based on this data relate to the date on which image data S0 was obtained. FIG. 2 is a drawing provided for explanation of selection of a representative image based upon data related to the date on which image data S0 was obtained. For example, the graph in FIG. 2 shows the distribution of the relationship between time and number of images for a day, among a course of several days, on which 20 images were obtained, and another day, among a course of several days, on which 4 images were obtained. Representative image selecting means 4 selects 3 representative images from among the 24 images, for a case in which the distribution of the times at which the images were obtained is that shown in FIG. 2., the number of images in each distribution is considered, and 2 representative images are selected from the first date group and 1 representative image is selected from the later date group. This selection process is carried out in a random manner. Note that for cases in which the date on which images were obtained are substantially concentrated in the same period, or for cases in which the date distribution is random, 3 images are selected at random from all the images.

Further, currently there are digital cameras available that are equipped with a GPS function, and when image data S0 has been obtained with such a digital camera, GPS data, that is, data related to the place at which the image data was obtained, is attached thereto. That is to say, for a case in which 20 images have been obtained at one location and 4 images at another, in the same way as for cases in which aforementioned date data is attached to the images, 2 representative images can be selected from images obtained at one location and 1 representative image from the other. In addition, for cases in which the images were primarily obtained at one location or the locations at which the images were obtained is random, 3 representative images can be selected at random from all of the images.

Still further, there are digital cameras with which it is possible to attach at the time an image is obtained data related to the degree of importance of an image. In this type of case, an evaluation as to whether or not data related to the degree of importance of an image has been attached or not is conducted, and images to which degree of importance data has been attached can be selected as representative images. Note that for cases in which there are more than 3 images to which degree of importance data has been attached, three images can be selected therefrom at random, and for cases in which there are less than 3 images to which degree of importance data has been attached, representative images can be selected at random from the other images.

Figure 3:
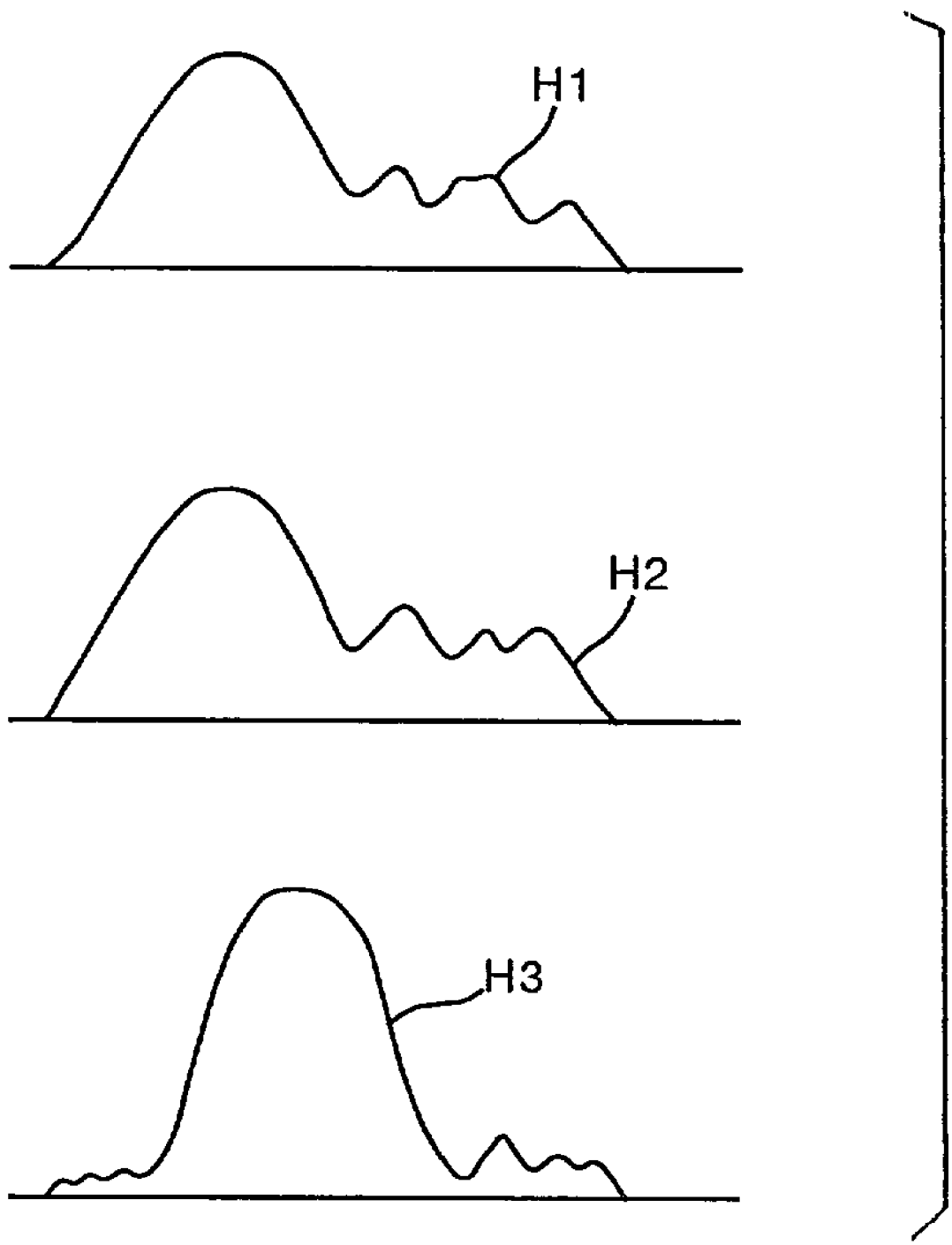
FIG. 3 is a drawing provided for explanation of the degree of similarity of plural sets of image data.

Further still, representative images can be selected corresponding to the degree of similarity of images. More specifically, a histogram of an image data S1 is formed as a quantification of the characteristics thereof, and depending on whether or not the form, that is, the distribution of data, of these histograms are similar, the degree of similarity is determined. For example, as shown in FIG. 3, histograms H1 and H2 are similar, however, histogram H1 and histogram H3 are not similar. Accordingly, the images of which histograms H1 and H2 have been obtained are similar, however, the images of which histograms H1 and H3 have been obtained are not similar. In this way, image data S1 is grouped based upon the degree of similarity between images, and 1 image can be selected from each group as a representative image. Note that for cases in which there are more than three groups, a representative image is selected from each group, and from among the selected representative images, three representative images can be selected at random. In addition, for cases in which there are less than 3 images, more than 1 image is selected from the group or groups, and three images can be selected therefrom at random.

Note that representative images can be selected from all the images in a random manner, without the use of date-obtained information.

In addition, selection of the representative images can be based upon data attached, indicating which images represented by the image data should be the representative images, by a user at the time of photographing.

Representative image attaching means 5 attaches 3 thumbnail images 9 to surface 8 of storage medium disk 7. More specifically, for cases in which surface 8 of storage medium disk 7 has been subjected to a matting process and is printable, thumbnail images 9 of the representative images are printed thereon by use of an inkjet printer. In addition, thumbnail images 9 can also be attached by use of offset or screen-printing, however, a transfer method as described in Japanese Unexamined Patent Publication No. 5(1993)-212857, wherein toner is applied to a latent image of thumbnail image 9 formed, by use of a laser beam, on the surface of a photosensitive drum to form a toner image, and a full-color toner image of said toner image is formed on the surface of a transfer drum by repeated performance of the transfer process, employing a number of printing colors, and said toner image formed on the surface of the transfer drum is transferred to surface 8 of storage medium 7, can also be used.

In addition, representative image attaching means 5 can also be a means for affixing stickers on which thumbnail images 9 of representative images have been printed to surface 8 of storage medium disk 7. Here, a method such as that described in Japanese Unexamined Patent Publication No. 10(1998)-100495, wherein thumbnail images printed onto a heat-transfer sticker sheet by a heat-transfer method, after which a half-cut processing is performed can be employed as the method for carrying out printing of the stickers.

Figure 4:
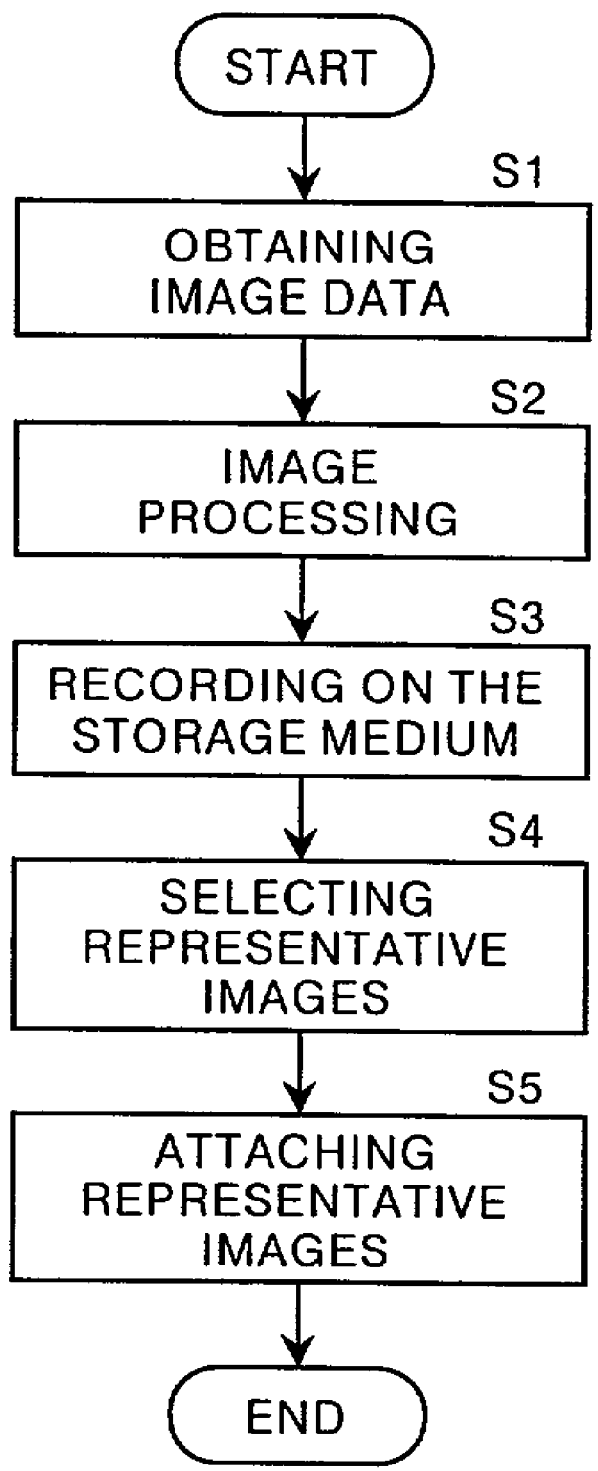
FIG. 4 is a flowchart of the operating process of the current embodiment.

Next, the operation of the first embodiment will be explained. FIG. 4 is a flowchart of the operation of the first embodiment. First, data obtaining means 1 obtains image data S0 from the storage medium of a digital camera, etc. (Step S1). Image processing means 2 obtains processed image data S1, which has undergone a predetermined image processing, of plural sets of obtained image data S0 (Step S2). Image data S1 is recorded onto storage medium 7 by image recording means 3 (Step S3). On the one hand, image data S1 is input to representative image selecting means 4 and representative images of the images represented by image data S1 are selected (Step 4). Note that the processing of Step S4 can be carried out before or at the same time as the processing of Step S3. Then, representative image attaching means 5 attaches thumbnail images 9 of the representative images to surface 8 of storage medium disk 7 and the processing is complete. In this way, three thumbnail images of the representative images of image data S1 recorded on storage medium 7 are attached to the surface thereof, as shown in FIG. 1.

In this way, in the current embodiment, because thumbnail images 9 of the representative images of image data S1 recorded on storage medium 7 are attached to surface 8 thereof, by simply looking at the storage medium 7, the content of the images stored thereon can be confirmed. Accordingly, even if there is no printed index of the images recorded on storage medium 7, because it is becomes unnecessary to load storage medium 7 in a computer and view the images recorded thereon by use of a viewer in order to confirm the content (images) recorded thereon, the amount of time and effort required when searching for a desired image can be reduced.

Figure 5:
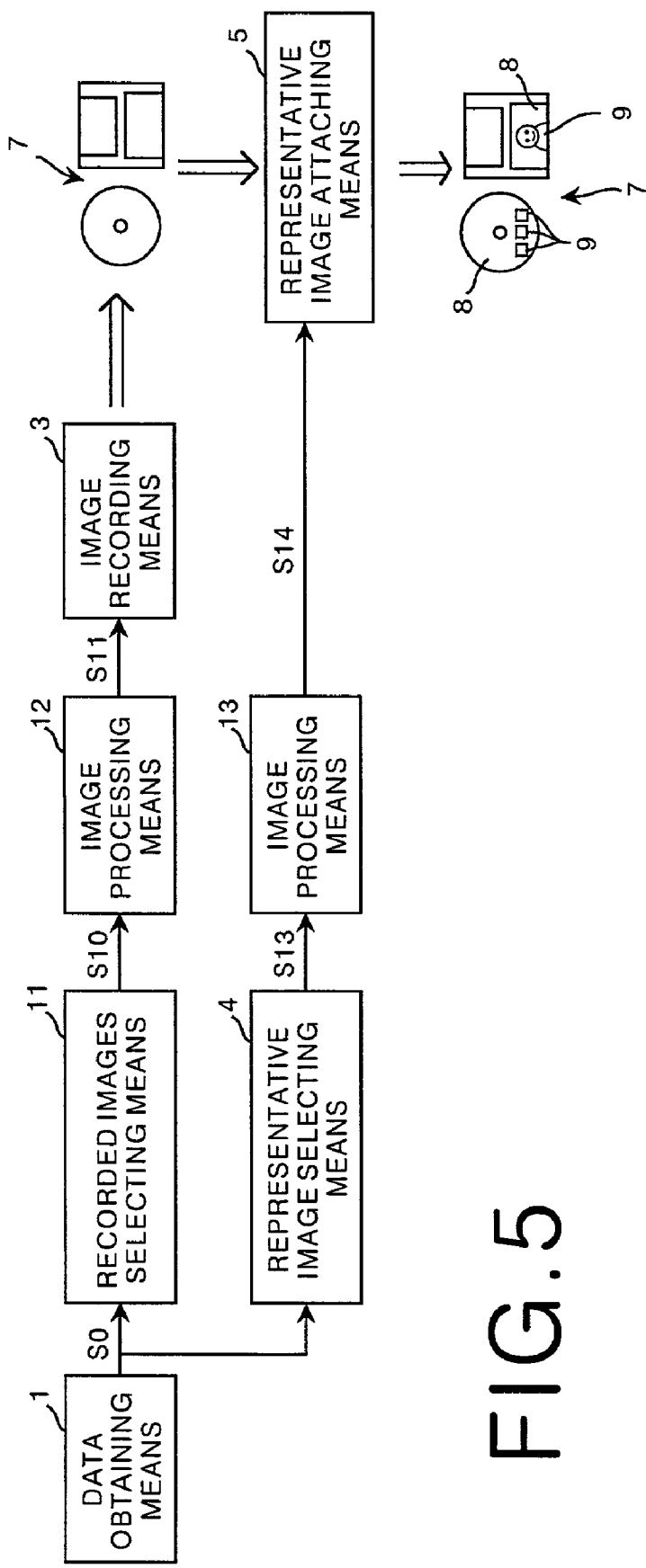
FIG. 5 is a schematic block diagram of an image recording system according to a second preferred embodiment of the present invention.

Next, a second preferred embodiment of the present invention will be explained. FIG. 5 is a schematic block drawing of an image recording system implementing the image recording apparatus according to a second embodiment of the present invention. As shown in FIG. 5, the image recording system according to the second embodiment of the present invention comprises a data obtaining means 1, of the same type as that of the first embodiment, for obtaining plural sets of image data S0, an images-to-be-recorded selecting means 11 for selecting from the plural sets of image data S0 image data S10 to be recorded onto storage medium 7, an image processing means 12 for subjecting image data S10 to any of a variety of image processing and obtaining processed image data S11 of, an image recording means 3, of the same type as that of the first embodiment, for recording plural sets of processed image data 11 onto storage medium 7, a representative image selecting means 4, of the same type as that of the first embodiment, for selecting representative image data 13 from the plural sets of image data S0 and representative thereof, an image processing means 14 for subjecting representative image data 13 selected by representative image selecting means 4 to image processing and obtaining processed representative image data 14, and a representative image attaching means, of the same type as that of the first embodiment, for attaching thumbnail images 9 of the representative images represented by processed representative image data 14 to surface 8 of storage medium 7. Note that according to the current embodiment, storage medium 7 is shown in the drawings as a CD-R and a Smart Media.

In the same way as image processing means 2 of the first embodiment, image processing means 12 and 13 subject image data S10 and S13 to predetermined image processing such as density correction processing, white-balance adjustment processing, gradation correction processing, sharpness processing, pixel number correction processing, blemish and dust mark removal processing, trimming processing, etc. and obtain processed image data S11 and S13.

Representative image selecting means 4 is a means for selecting representative images from the images represented by the plural sets of image data S0 obtained by image obtaining means 1.

According to the second embodiment, images-to-be-recorded selecting means 11 selects plural sets of image data S10 from plural sets of image data S0 that should be recorded on storage medium 7, image processing means 12 subjects selected image data S10 to predetermined image processing and obtains processed image data S11, and image recording means S13 records said image data S11 is onto storage medium 7. Note that all of the plural sets of image data S0 can be recorded onto storage medium 7 as the plural sets of image data S10.

On the other hand, representative image selecting means 4 selects representative images from the images represented by plural sets of image data S0, and selected representative image data 13 is subjected to predetermined image processing by image processing means 13 and processed representative image data 14 is obtained. Then, by attaching thumbnail images 9 of the representative images represented by processed representative image data S14 to surface 8 of storage medium 7, storage medium 7 having thumbnail images 9 attached to surface 8 thereof is obtained. Note that because the representative images are selected from the images represented by image data S0, there are cases in which the representative images will not be included in image data S10 recorded on storage medium 7.

Here, for cases in which storage medium 7 is a CD-R, thumbnail images 9 of representative images are attached to the physical region on which data is recorded, however, as shown in FIG. 5, for cases in which a Smart Media is used, thumbnail images 9 are attached to the support body in a region outside of the data recording region.

Note that according to embodiments 1 and 2 described above, an explanation for a case in which image data read out from a digital camera or digital video camera storage medium was recorded on storage medium 7 was given, however, the present invention can also be applied to cases in which image data is obtained by reading out images recorded on film and recorded on storage medium 7. In this case, representative image selecting means 4 can randomly select representative images from the images recorded on film, however, for cases in which a date is included in the images recorded on film, data related to the date and time at which the images were obtained is obtained from the portion in which the date is recorded, and the representative images can be selected based on the date-obtained data, in the same way as in the embodiment described above. In addition, representative images can be selected based on the degree of similarity between images.

In addition, for cases in which so-called APS film, which is incapable of recording magnetic data, is used, various types of data, such as date-obtained data, data on the location at which an image was obtained, GPS data, degree of importance data, etc. can be recorded in the camera on the magnetic recording portion of the film. Accordingly, when data obtaining means 1 obtains image data S0 by the reading out of an image recorded on film, by also reading out the data recorded on the magnetic recording portion of the film and attaching said data to image data S0, representative image selecting means 4 can select the representative images based on the data attached to image data S0, in the same way as in the embodiment described above.

Further, in embodiments 1 and 2 described above, 1 or 3 images were attached to surface 8 of storage medium 7 as representative images, however, any number of images may be attached thereto as representative images; all of the images represented by the image data recorded on storage medium 7 can be attached to surface 8 of storage medium 7 as representative images. In particular, for cases in which the number of image data S1 recorded on storage medium 7, all of the images can be attached to surface 8 of storage medium 7 as thumbnail images 9 (representative images).

What is claimed is:

1. An image recording method for recording some or all of plural sets of image data on a storage medium disk, comprising steps of selecting representative images of the images represented by said plural sets of image data, and directly printing thumbnail images of said representative images onto a surface of said storage medium disk, wherein said representative images are selected based on predetermined data attached to said plural sets of image data.

2. An image recording method as defined in claim 1, wherein said representative images are selected based on the degree of similarity of said plural sets of image data.

3. An image recording apparatus for recording some or all of plural sets of image data on a storage medium disk comprising
    a selecting means for selecting representative images representative of the images represented by said plural sets of image data, and
    a representative image attaching means for directly printing thumbnail images of said selected representative images onto a surface of said storage medium disk, wherein said selecting means selects said representative images based on predetermined data attached to said plural sets of image data.

4. An image recording apparatus as defined in claim 3, wherein said selecting means selects said representative images based on the degree of similarity of said plural sets of image data.

5. A computer readable storage medium for recording a program that causes a computer to execute the recording method of recording some or all of plural sets of image data onto a storage medium disk, wherein
    said program includes a selecting procedure for selecting representative images representative of the images represented by said plural sets of image data, and
    an attaching procedure for directly printing thumbnail images of said representative images onto a surface of said storage medium disk, wherein said selecting procedure selects said representative images based on predetermined data attached to said plural sets of image data.

6. A computer readable storage medium as defined in claim 5, wherein said selecting procedure selects said representative images based on the degree of similarity of said plural sets of image data.

7. An image recording method for recording some or all of plural sets of image data on a storage medium disk, comprising steps of selecting representative images of the images represented by said plural sets of image data, and attaching thumbnail images of said representative images to the surface of said storage medium disk, wherein said representative images are selected based on predetermined data attached to said plural sets of image data.

8. An image recording apparatus for recording some or all of plural sets of image data on a storage medium disk, comprising
   a selecting means for selecting representative images representative of the images represented by said plural sets of image data, and
   a representative image attaching means for attaching thumbnail images of said selected representative images to the surface of said storage medium disk, wherein said selecting means selects said representative images based on predetermined data attached to said plural sets of image data.

9. A computer readable storage medium for recording a program that causes a computer to execute the recording method of recording some or all of plural sets of image data onto a storage medium disk, wherein
   said program includes a selecting procedure for selecting representative images representative of the images represented by said plural sets of image data, and
   an attaching procedure for attaching thumbnail images of said representative images to the surface of said storage medium disk, wherein said selecting procedure selects said representative images based on predetermined data attached to said plural sets of image data.

* * * * *